Aug. 14, 1928.  1,681,002
F. G. LONDAGIN
PURIFYING DEVICE
Filed April 22, 1927   2 Sheets-Sheet 1

INVENTOR
F. G. LONDAGIN
BY
F. P. Gorin
ATTORNEY

Aug. 14, 1928.
F. G. LONDAGIN
1,681,002
PURIFYING DEVICE
Filed April 22, 1927    2 Sheets-Sheet 2
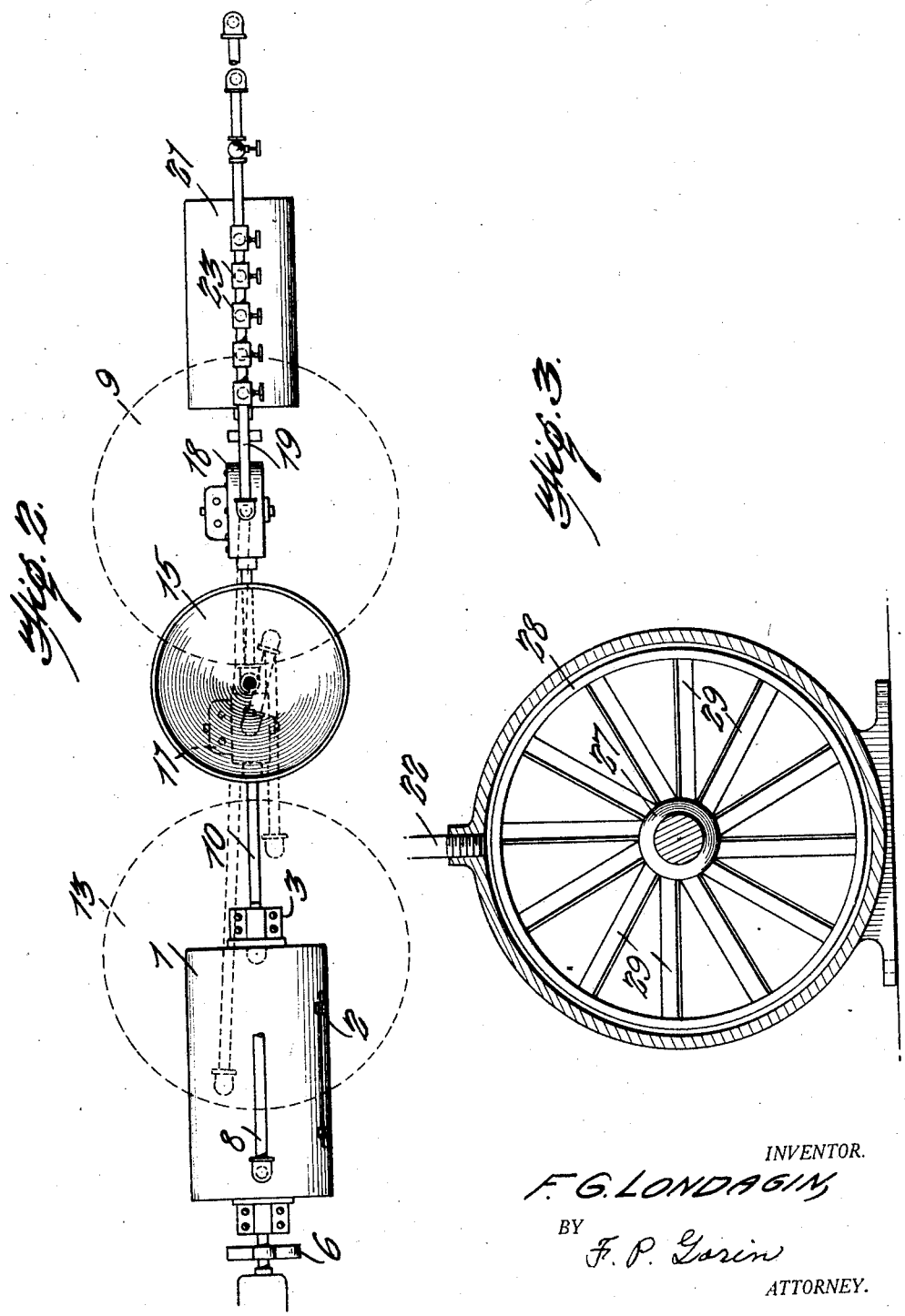
INVENTOR.
F. G. LONDAGIN,
BY F. P. Gorin
ATTORNEY.

Patented Aug. 14, 1928.

1,681,002

UNITED STATES PATENT OFFICE.

FREDERICK G. LONDAGIN, OF SEATTLE, WASHINGTON.

PURIFYING DEVICE.

Application filed April 22, 1927. Serial No. 185,852.

This invention relates to purifying systems and apparatus designed more particularly for removing sediment and the like from a cleansing liquid to permit said liquid, after purification, to be continually reused.

The invention is particularly adapted for use in connection with laundries wherein, after use, the washing fluid becomes charged with sediment which also collects in the interior of the pipes in the system, and the primary object of the invention is the provision of means whereby the washing fluid may be so treated as to remove the sediment therefrom in order that it may be reused in a cleanly condition.

The invention is illustrated in the accompanying drawings, in which:

Figure 2 is a plan view of the same.

Figure 3 is a side elevation of one of the agitators, the casing being shown in section.

Figure 1:
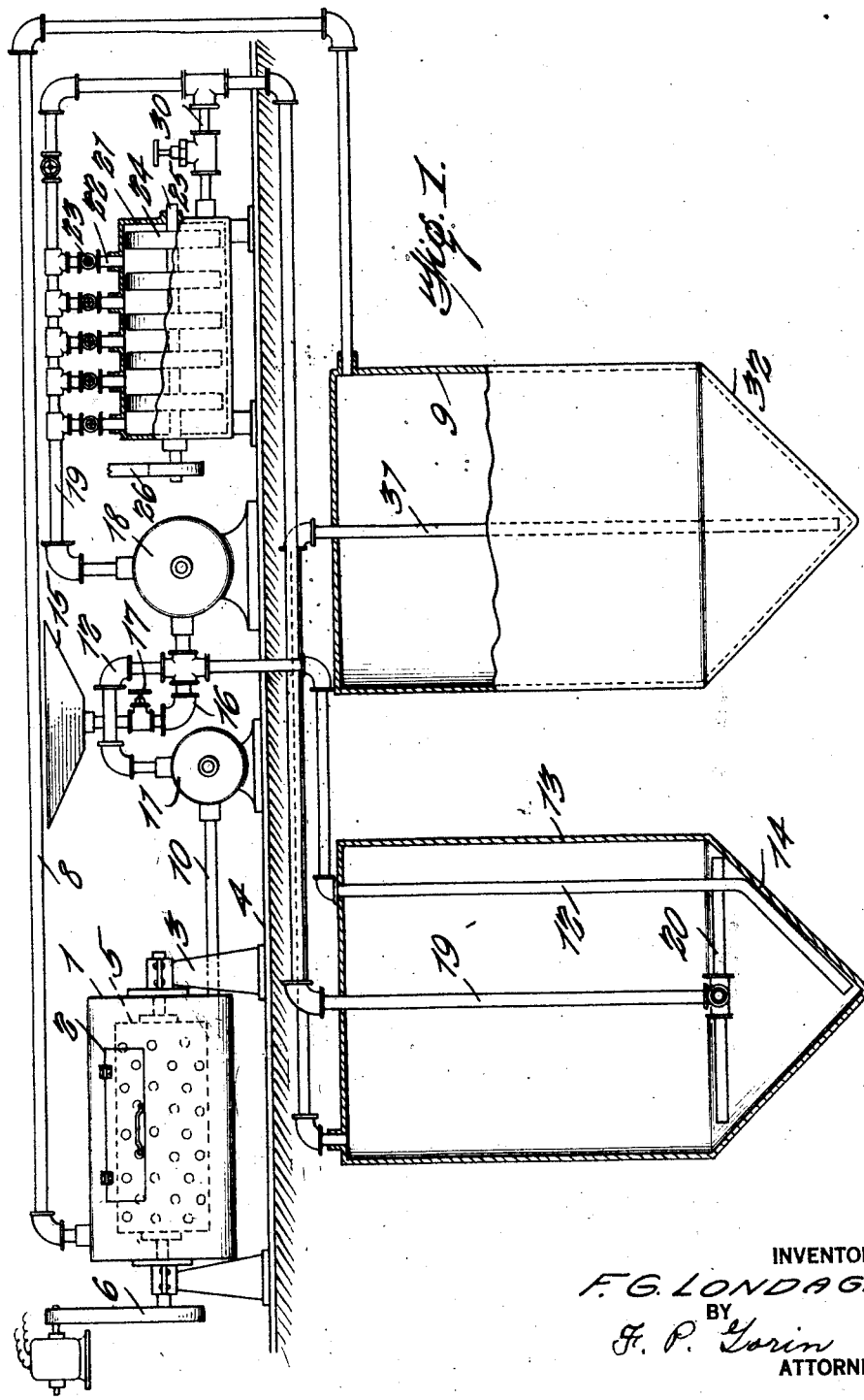
Figure 1 is a view in side elevation, partly in section, of the improved purifying system and apparatus.

The invention is here shown as applied to a power laundry which, for the purposes of this invention, may be said to include one or more containers 1 having doors 2 and mounted on pedestals 3 from the floor 4. The usual clothes-receiving perforated drum 5 is mounted for rotative movement in the container 1 through belt 6 driven from motor 7. A cleansing fluid inlet pipe 8 leads into the upper portion of the container from a tank 9 which is supported below the floor 4 and preferably, though not necessarily, buried in the ground, as indicated.

The outlet pipe 10 from the container leads to and through a circulating pump 11, the outlet from the pump 11 being in the form of a pipe 12 which leads to and discharges at the lower end of a tank 13 similarly located but spaced from the tank 9. The lower end of the tank 13 is of conical formation, as at 14, and the outlet end of the pipe 12 conforms to the inclination of the wall of the conical portion and discharges at the extreme lower end of such portion.

A receiver for the initial supply of cleansing fluid, here shown as a funnel-shaped member 15, is arranged adjacent the circulating pump 11 and communicates through a pipe 16 having a valve 17 with the pipe 12 beyond the pump 11. The pipe 16 also communicates with a second circulating pump 18, the outlet of which is in the form of a pipe 19 extending to and depending within the tank 13 terminating preferably at the juncture of the cylindrical and conical portions of the tank in the form of divergent branches 20.

Mounted adjacent the pump 18 is an agitator casing 21 having a series of pipe connections 22 with the pipe 19, each of the pipe connections 22 having a valve 23. Arranged within the casing 21 are a series of agitators 24 supported upon a shaft 25 rotatably mounted in the casing and driven through the power operated belt 26. The agitators, as shown more particularly in Figure 3, include a hub 27 removably fixed upon the shaft 25, a rim 28 and a series of blades 29 in radial spaced relation between the hub and rim.

The casing 21 has a valve controlled outlet pipe 30 opening into pipe 19 intermediate the agitator and tank 13. The tanks 9 and 13 are connected through the medium of a pipe 31 which opens within the tank 9 at the lower end of the latter and within the tank 13 at the extreme upper end of the latter. If desired and as preferred, the tank 9 may have a conical lower end 32, in which event the open end of the pipe 31 extends to the apex of the conical portion.

The operation and use of the apparatus is as follows. The process of cleansing the solvents, such as gasoline, etc., is by precipitation, that is, the impurities are allowed to precipitate out of the cleansing fluid following the use of a suitable chemical, such as caustic soda. The present apparatus serves to give the impure solvent a maximum treatment with the chemical. Obviously, the chemical must be soluble in water but substantially insoluble in the pure cleansing fluid. Initially, the valve 17 is opened and the chemical water solution is fed in and flows by pipe 12 into the bottom of the tank 14 and accumulates to a depth substantially at the level of the distributor 20. The pure cleansing fluid, such as gasoline, is then poured in until the tank 14 overflows through pipe 31 to fill tank 32 and through pipe 8 to fill the washing machine 1. The garments or other material to be cleansed are then placed in the washing machine and the pumps 11 and 18 operated together with the agitator. The pump 18 is of such capacity that it will draw up the chemical solution from the bottom of tank 14 and force it through the agitator, then down the pipe 19 to the distributor 20. Thus, a continuous circulation of the chemical solution is maintained by pump 18. The pump 11, which is also operating, draws the solvent, such as gasoline with its impurities following its cleansing use, from the bottom of the washing machine and into the circulatory path of the cleansing chemical solution. A mixture occurs and the chemical solution and impure cleansing solvent are forced through the agitator and thoroughly mixed, so that the chemical contained in the water solution will affect the dirt or refuse in the gasoline or like solvent which is later discharged through the distributor 20 into the bottom of tank 13. Here a gravital separation occurs, the chemical solution together with the impurities remaining at the bottom of the tank and the purified gasoline or like solvent rising to the top. During the upward movement of the purified gasoline, there is of course a further gravitational precipitation of any contained impurities which are heavy enough to settle out of the solution. The gasoline or other cleansing solvent will of course pass through tank 13 into tank 32, where a further gravitational separation of impurities is permitted.

Of course, the tanks are to be cleaned from time to time to relieve them of any accumulated impurities and the chemical treating solution will be renewed or restored to strength from time to time as may be required.

What I claim to be new is:

1. A purification apparatus in connection with dry cleaners and the like using a solvent such as gasoline, comprising a plurality of settling tanks, means for delivering a chemical solution to one of the tanks, means for circulating said solution, and means for circulating the impure cleansing solvent through a portion of the path of the chemical solution.

2. A purification apparatus in connection with dry cleaners and the like using a solvent such as gasoline, comprising a plurality of settling tanks, means for delivering a chemical solution to one of the tanks, means for circulating said solution, means for circulating the impure cleansing solvent through a portion of the path of the chemical solution, and an agitator in the path of circulation of the combined fluids.

3. A purification system for a cleansing solvent, including a machine in which the material is subjected to the solvent for the cleansing of the material, two independent settling tanks, one of said tanks being adapted to contain a chemical solution in the lower portion thereof, a pump for maintaining a circulation of said chemical solution, a second pump for withdrawing the impure cleansing solvent from the material machine and directing it into the path of circulation of the chemical solution, and an agitator through which the combined fluids are forced following their commingling.

In testimony whereof I affix my signature.

FREDERICK G. LONDAGIN.